(12) United States Patent
Mine et al.

(10) Patent No.: US 11,838,469 B2
(45) Date of Patent: Dec. 5, 2023

(54) IMAGE FORMING SYSTEM AND CONTROL METHOD OF THE SYSTEM

(71) Applicant: Konica Minolta, Inc., Tokyo (JP)

(72) Inventors: Hidenori Mine, Tachikawa (JP); Masayuki Watanabe, Fuchu (JP); Harumitsu Fujimori, Toyokawa (JP); Takanobu Shiki, Sagamihara (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/862,763

(22) Filed: Jul. 12, 2022

(65) Prior Publication Data

US 2023/0095964 A1 Mar. 30, 2023

(30) Foreign Application Priority Data

Sep. 16, 2021 (JP) ................. 2021-150812

(51) Int. Cl.
*H04N 1/00* (2006.01)
(52) U.S. Cl.
CPC ..... *H04N 1/00806* (2013.01); *H04N 1/00588* (2013.01); *H04N 1/00673* (2013.01)
(58) Field of Classification Search
CPC ........... G03G 15/1615; G03G 15/5008; G03G 2215/0161; G03G 15/0194; G03G 15/161; G03G 15/6529; G03G 2215/00075; G03G 2215/00945; G03G 2215/00949; G03G 2215/0119; G03G 2215/0132; G03G 2215/0193; G03G 2215/1623; G03G 2215/1661; G03G 2215/2035; G03G 2215/2045; G03G 15/0136;

(Continued)

(56) References Cited

U.S. PATENT DOCUMENTS 5,893,657 A * 4/1999 Matsuzawa ............ G03G 15/70
399/388
5,905,934 A * 5/1999 Koshimizu .......... G03G 15/231
399/401

(Continued)

FOREIGN PATENT DOCUMENTS

JP 2011-123197 A 6/2011
JP 2016-103719 A 6/2016

(Continued)

OTHER PUBLICATIONS

Extended European Search Report issued in related European Application No. 22195537.0 dated Jan. 31, 2023 (10 pages).

*Primary Examiner* — Negussie Worku
(74) *Attorney, Agent, or Firm* — Osha Bergman Watanabe & Burton LLP

(57) ABSTRACT

An image forming system includes: an image forming device that is disposed at a first conveyance path and forms an image on a recording medium that is a continuous sheet or a long sheet; a first conveyor that conveys the recording medium on the first conveyance path in a conveyance direction; an image reader that reads the image formed on the recording medium at a second conveyance path on a downstream side of the first conveyance path in the conveyance direction; a second conveyor that conveys the recording medium on the second conveyance path; and a controller that controls a speed of a drive source of the first conveyor and controls a torque of a drive source of the second conveyor.

17 Claims, 10 Drawing Sheets

(58) Field of Classification Search
CPC ........... G03G 15/0849; G03G 15/0853; G03G 15/0893; G03G 15/09; G03G 15/235; G03G 15/5058; G03G 15/6564; G03G 15/757; G03G 2215/00059; G03G 2215/00556; A44B 19/46; H04N 1/0473; H04N 1/12; H04N 1/506; H04N 2201/02439; H04N 2201/0471; H04N 2201/04722; H04N 2201/04734; H04N 2201/04756; H04N 2201/04794; Y10T 156/1712; Y10T 29/5101; Y10T 29/53304; B60J 1/20; B60J 3/005; E06B 2009/527; E06B 9/52
USPC ......................................................... 358/498
See application file for complete search history.

(56) References Cited

U.S. PATENT DOCUMENTS

| | | | |
|---|---|---|---|
| 6,263,186 B1 * | 7/2001 | Okamoto | G03G 15/6564 399/388 |
| 7,899,341 B2 * | 3/2011 | Moro | G03G 15/5062 399/397 |
| 8,014,709 B2 * | 9/2011 | Aoi | G03G 15/6558 399/388 |
| 2011/0211896 A1 | 9/2011 | Kawaguchi et al. | |
| 2013/0266357 A1 * | 10/2013 | Egawa | G03G 15/6552 399/405 |
| 2015/0183240 A1 * | 7/2015 | Terada | B41J 13/009 347/16 |
| 2017/0102654 A1 * | 4/2017 | Umehara | G03G 15/6529 |
| 2018/0086579 A1 * | 3/2018 | Andoh | B65H 7/12 |
| 2018/0099827 A1 * | 4/2018 | Tsuboi | B65H 5/06 |
| 2018/0198943 A1 * | 7/2018 | Yoshikaie | H04N 1/047 |
| 2018/0265314 A1 * | 9/2018 | Seki | G03G 15/1615 |
| 2019/0177102 A1 | 6/2019 | Yamaguchi et al. | |
| 2019/0193967 A1 * | 6/2019 | Shuto | H04N 1/00602 |
| 2020/0130972 A1 * | 4/2020 | Miyauchi | B65H 43/04 |
| 2020/0177759 A1 * | 6/2020 | Xu | H04N 1/00702 |
| 2020/0301326 A1 | 9/2020 | Yamazaki et al. | |
| 2023/0037177 A1 * | 2/2023 | Chike | G03G 15/70 |
| 2023/0091128 A1 * | 3/2023 | Yamaguchi | G03G 15/6573 399/381 |

FOREIGN PATENT DOCUMENTS

| | | |
|---|---|---|
| JP | 2017-009721 A | 1/2017 |
| JP | 2018-078366 A | 5/2018 |

* cited by examiner

| PAPER TYPE | DENSITY D | MOISTURE CONTENT W | ELASTIC COEFFICIENT E∝D,W | CORRECTED TENSION Fp |
|---|---|---|---|---|
| COATED PAPER | D1 | W1 | 1.2 | Fp1 |
| PLAIN PAPER | D2 | W2 | 1.0 | Fp2 |
| CARBON PAPER | D3 | W3 | 0.8 | Fp3 |

IMAGE FORMING SYSTEM AND CONTROL METHOD OF THE SYSTEM

CROSS-REFERENCE TO RELATED APPLICATIONS

The entire disclosure of Japanese Patent Application No. 2021-150812 filed on Sep. 16, 2021 is incorporated herein by reference.

BACKGROUND

1. Technical Field

The present invention relates to an image forming system and a control method thereof.

2. Description of Related Art

In known image forming systems, an image reading device reads a sheet on which an image has been formed, inspects a defect of an image or a color, and processes a sheet as a waste sheet (for example, JP 2018-078366A).

Such an image reading device for a sheet controls speeds of conveyance rollers provided before and after the image reading device so that a conveyance roller on the downstream side is slightly faster than a conveyance roller on the upstream side. As a result, the image reading device applies tension to the sheet to maintain the reading height (depth) of the image reading device constant. This ensures the reading performance.

On the other hand, in recent years, there has also been an increasing need for image formation on a continuous sheet (roll sheet) or a sheet longer than a standard-sized sheet (JP 2017-9721A).

Application of the image reading device to an image forming system for such a long sheet or continuous sheet has been studied.

Applying the image reading device to an image forming system for a long sheet, a continuous sheet, or the like, may cause the following issues.

On the upstream side in the sheet conveyance direction of the image reading device, a process conveyance section of the image forming unit, for example, a fixing roller is provided. Normally, a target speed of the fixing roller is controlled to be the same as a conveyance speed of an image forming process on the upstream side so that a speed difference between a transfer unit and a fixing section does not cause transfer deviation.

Rotational driving of the fixing roller is performed with a high driving force for stability in consideration of, for example:

a case where a heavy roller made of metal having a high heat capacity is used because it is necessary to perform pressing, heating or the like on an object such as a sheet; and a case where conveyance is performed in a state where a fixing nip pressure is applied.

On the other hand, conveyance rollers other than the fixing roller have a small nip pressure and a small weight, and do not have a driving force as large as that of the fixing roller. Therefore, in image formation on a long sheet, a continuous sheet, or the like, when the speed of conveyance rollers of the image reading device, which is on the downstream side of the fixing roller, is controlled to be slightly higher than the fixing roller in the same manner as image formation on a standard-sized sheet, the conveyance rollers of the image reading device is influenced by the fixing roller having a high driving force. It is difficult to maintain the target speed of the image reading device. This leads to an unstable conveyance speed. This may have a significant impact on reading performance.

SUMMARY

One or more embodiments of the present invention stabilize reading in an image reading device for a long sheet or a continuous sheet.

According to an aspect of the present invention, an image forming system includes:

an image forming unit (i.e., image forming device) that forms an image on a recording medium that is a continuous sheet or a long sheet;

a first conveyance section (i.e., first conveyor) that conveys the recording medium on a first conveyance path on which the image forming unit is placed;

an image reading section (i.e., image reader) that reads an image formed on the recording medium in a second conveyance path on a downstream side of the first conveyance path in a conveyance direction of the recording medium;

a second conveyance section (i.e., second conveyor) that conveys the recording medium on the second conveyance path; and a controller that performs speed control on a drive source of the first conveyance section and performs torque control on a drive source of the second conveyance section.

Another aspect of the present invention is a method of controlling an image forming system, wherein the image forming system includes:
  an image forming unit that forms an image on a recording medium that is a continuous sheet or a long sheet;
  a first conveyance section that conveys the recording medium on a first conveyance path on which the image forming unit is placed;
  an image reading section that reads an image on the recording medium in a second conveyance path on a downstream side of the first conveyance path in a conveyance direction of the recording medium;
  a second conveyance section that conveys the recording medium on the second conveyance path, and the method includes:
performing speed control on a drive source of the first conveyance section; and
performing torque control on a drive source of the second conveyance section.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Embodiments of an image forming system will be described in detail with reference to the drawings. The image forming system according to one or more embodiments is an example and the present invention is not necessarily limited thereto.

EXAMPLE OF ENTIRE CONFIGURATION OF IMAGE FORMING SYSTEM

Figure 1:
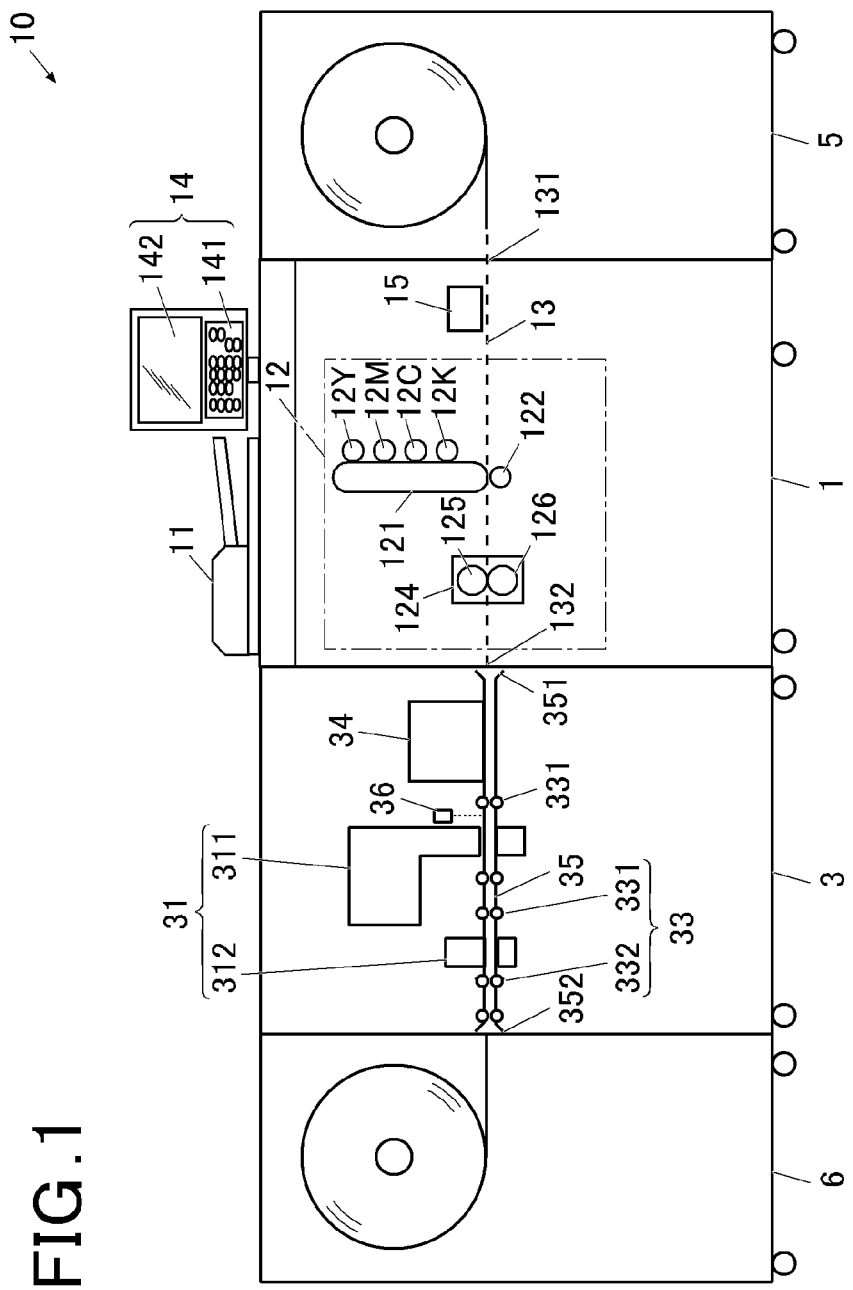
FIG. 1 is a schematic diagram of an image forming system according to one or more embodiments.
Figure 2:
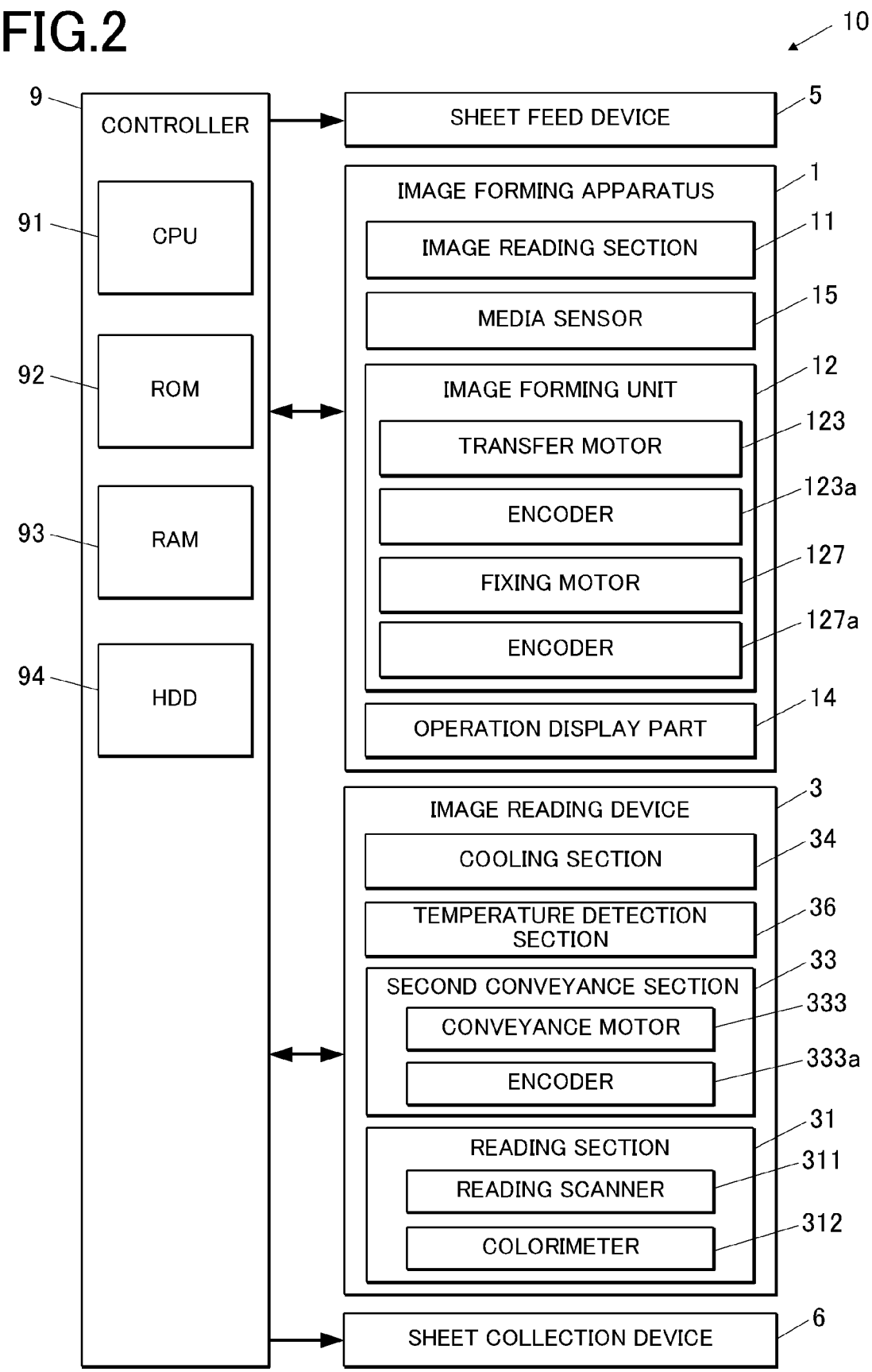
FIG. 2 is a block diagram illustrating a control system of the image forming system.

An example of the entire configuration of an image forming system 10 will be described with reference to the drawings. FIG. 1 is a schematic diagram of the image forming system 10. FIG. 2 is a block diagram illustrating a control system of the image forming system 10.

The image forming system 10 forms an image on a recording medium of continuous paper P as a continuous sheet. As illustrated in FIGS. 1 and 2, the image forming system 10 includes, in order from the upstream of the conveyance path of the continuous paper P, a sheet feed device 5, an image forming apparatus 1, an image reading device 3, and a sheet collection device 6 as a winding means.

The image forming system 10 includes a controller 9 that comprehensively controls the entire configuration described above. The controller 9 is communicably connected to the sheet feed device 5, the image forming apparatus 1, the image reading device 3, and the sheet collection device 6 by communication units included therein.

The continuous paper P used as a recording medium by the image forming system 10 represents a long recording paper that is continuous from a leading end fed out from a roll to a trailing end at the deepest portion of the roll.

SHEET FEED DEVICE

The sheet feed device 5 supports a roll of continuous paper P on which an image has not yet been formed, and includes a motor as a drive source (not illustrated) that rotationally drives the roll in a feed direction.

The sheet feed device 5 supplies the fed continuous paper P to a sheet feed port 131 of the image forming apparatus 1.

SHEET COLLECTION DEVICE

The sheet collection device 6 is a winding means for collecting, while winding, the continuous paper P on which an image has been formed and which has been read by the image reading device 3. The sheet collection device 6 includes a motor as a drive source (not illustrated) that rotationally drives a roll in order to form the roll while winding the continuous paper P.

The paper collection device 6 is connected to a sheet ejection port 352 of the image reading device 3, and collects the continuous paper P fed out from the sheet ejection port 352.

IMAGE FORMING APPARATUS

The image forming apparatus 1 is, for example, an electrophotographic image forming apparatus such as a copying machine. As shown in FIG. 1, the image forming apparatus 1 is also referred to as a so-called tandem color image forming apparatus. One intermediate transfer belt is disposed so as to extend along a predetermined direction (in one or more embodiments, the up-down direction). A plurality of photosensitive drums facing the intermediate transfer belt are arranged in the direction in which the belt extends. The image forming apparatus 1 is capable of forming a full-color image on the intermediate transfer belt.

As illustrated in FIGS. 1 and 2, the image forming apparatus 1 includes, for example, an image reading section (or image reader) 11, an image forming unit (or image forming device) 12, a first conveyance path 13, and an operation display part 14. The components of the image forming apparatus 1 are connected to each other via a bus (not shown).

IMAGE FORMING APPARATUS—IMAGE READING SECTION

The image reading section 11 includes an automatic document feeder (ADF), a platen glass, an optical system, and the like. The image reading section 11 reads a document placed on the ADF or the platen glass by the optical system to obtain image data.

The image forming apparatus 1 can acquire image data from not only the image reading section 11 but also an external host device (for example, a personal computer) or the like through communication.

IMAGE FORMING APPARATUS—IMAGE FORMING UNIT

The image forming unit 12 forms an image with toner on the continuous paper P based on the acquired image data. The image forming unit 12 includes, for example, an image forming section 12C that forms an image of cyan C, an image forming section 12M that forms an image of magenta (M), an image forming section 12Y that forms an image of yellow (Y), an image forming section 12K that forms an image of black (K), an intermediate transfer belt 121, an intermediate transfer roller 122, and a fixing section (or fixing device) 124. The image forming sections 12C to 12K may have, for example, a configuration including only one of the image forming sections 12C to 12K or a configuration including a plurality of only one type of the image forming sections 12C to 12K.

Each of the image forming sections 12C to 12K includes:
a photosensitive drum on which a toner image is formed;
a charging section that charges the photosensitive drum at a predetermined potential;
an exposure section that exposes a charged image bearing member to form an electrostatic latent image corresponding to image data;
a developing section that forms a toner image by developing an electrostatic latent image; and a drum cleaner that removes residual toner from the photosensitive drum.

An image formed on each photosensitive drum is primarily transferred sequentially to a predetermined position on the intermediate transfer belt 121, which is a belt-shaped intermediate transfer member. The image of each color transferred to the intermediate transfer belt 121 is secondarily transferred, between the intermediate transfer belt 121 and the intermediate transfer roller 122, to the continuous paper P conveyed through the first conveyance path 13.

Conveyance of the intermediate transfer belt 121 and rotation of the intermediate transfer roller 122 are driven by a transfer motor 123 (see FIG. 2). The transfer motor 123 is constituted by, for example, a DC motor or an AC motor suitable for speed control or torque control. In the present example, the transfer motor 123 is a DC brushless motor. The transfer motor 123 is provided with an encoder 123a for detecting the amount of rotation thereof.

On the downstream side of the intermediate transfer belt 121, a fixing section 124 is provided.

The fixing section 124 includes:

a fixing roller 125 and a pressure roller 126 that fix the secondarily transferred toner image on the continuous paper P; and a fixing motor 127 (see FIG. 2) serving as a rotational drive source for these components.

The fixing motor 127 is composed of, for example, a DC motor or an AC motor. In the present example, the fixing motor 127 is a DC brushless motor. The fixing motor 127 is provided with an encoder 127a for detecting the amount of rotation thereof.

The fixing section 124 conveys the continuous paper P by a pair of pressure-bonded fixing roller 125 and pressure roller 126, and performs fixing processing for fixing the toner image. A heater is provided inside the fixing roller 125. The heater heats the continuous paper P passing through a fixing nip between the fixing roller 125 and the pressure roller 126. The heater melts the toner image and fixes it to the continuous paper P.

IMAGE FORMING APPARATUS—FIRST CONVEYANCE PATH

As illustrated in FIG. 1, the first conveyance path 13 is a conveyance path of the continuous paper P from a sheet feed port 131 provided on one end (right side in FIG. 1) of the image forming apparatus 1 in the conveyance direction of the continuous paper P to a sheet ejection port 132 provided on the other end (left side in FIG. 1) in the conveyance direction of the continuous paper P.

On the first conveyance path 13, a media sensor 15 as a detection section (or detector) that detects physical properties of the continuous paper P, the intermediate transfer belt 121 and the intermediate transfer roller 122 of the image forming unit 12 described above, and the fixing section 124 are arranged in this order from the upstream side to the downstream side in the conveyance direction.

A guide roller that guides the conveyance of the continuous paper P may be provided on the path of the first conveyance path 13.

The first conveyance path 13 is provided with a first conveyance section (or first conveyor) that transports the continuous paper P along the path. The first conveyance section is composed of the intermediate transfer roller 122 and the transfer motor 123 of the image forming means 12, and the fixing roller 125, the pressure roller 126 and the fixing motor 127 of the fixing section 124. In addition, a conveyance roller as the first conveyance section may be disposed on the first conveyance path 13.

IMAGE FORMING APPARATUS—MEDIA SENSOR

The media sensor 15 detects physical properties of the continuous paper P on the upstream side in the conveyance direction of the intermediate transfer belt 121.

The media sensor 15 is composed of one or more sensors for measuring density and moisture content as characteristic values of the continuous paper P to be fed, and outputs the results of measurement to the controller 9.

The media sensor 15 includes, for example, an optical sensor including a light emitting section that irradiates the continuous paper P with light and a light receiving section that receives reflected light reflected by the continuous paper P. The media sensor 15 can acquire the basis weight (weight per unit area of one sheet) of the continuous paper P from the voltage value output by the light receiving section.

The media sensor 15 has a displacement sensor that detects the thickness of the continuous paper P, and can detect the density of the continuous paper P from the basis weight and thickness of the continuous paper P described above.

Furthermore, the media sensor 15 includes a capacitance sensor that detects the moisture content of the continuous paper P.

IMAGE FORMING APPARATUS—OPERATION DISPLAY PART

The operation display part 14 comprises, for example, an operation part 141 and a display part 142. The operation part 141 includes a plurality of operation buttons, and receives user operation. The display part 142 includes an LCD (liquid crystal display), an organic EL display, or the like. On the display, a pressure-sensitive touch panel in which transparent electrodes are arranged in a grid pattern is provided. The display part 142 presents various screens such as a guidance screen and a message regarding job execution to a user. The display part 142 displays an image of operation buttons for touch operation and accepts a user's touch operation.

IMAGE READING DEVICE

The image reading device 3 includes a reading section 31 as an image reading section, a second conveyance section (or second conveyor) 33, a cooling section (or cooling device) 34, a temperature detection section 36, and a second conveyance path 35.

As illustrated in FIG. 1, the second conveyance path 35 guides conveyance of the continuous paper P from the sheet feed port 351 to the sheet ejection port 352. The sheet feed port 351 is provided at one end (right side in FIG. 1) of the image reading device 3 in the conveyance direction of the continuous paper P. The sheet ejection port 352 is provided on the other end (left side in FIG. 1) in the conveyance direction of the continuous paper P.

The sheet feed port 351 is connected to the sheet ejection port 132 of the image forming apparatus 1. The continuous paper P on which an image has been formed is carried into the sheet feed port 351.

The sheet ejection port 352 is connected to the paper collection device 6, and the continuous paper P from which images have been read is carried out and collected by the paper collection device 6.

On the second conveyance path 35, the cooling section 34, the temperature detection section 36 and the reading section 31 are arranged in this order from the upstream side to the downstream side in the conveyance direction.

In the second conveyance path 35, guide rollers 331, a conveyance roller 332 as a drive roller, and a conveyance motor 333 (see FIG. 2) as a drive source are provided as the second conveyance section 33.

A plurality of guide rollers 331 are provided on the second conveyance path 35, and are composed of roller pairs that each sandwich the continuous paper P from both sides and guide the conveyance.

The conveyance roller 332 is provided on the downstream side of the colorimeter 312 in the conveyance direction on the second conveyance path 35, and includes a roller pair that transports the continuous paper P while sandwiching the continuous paper P from both sides.

The conveyance motor 333 rotationally drives a roller pair of the conveyance roller 332 to convey the continuous paper P to the downstream side via the conveyance roller 332. The conveyance motor 333 includes, for example, a DC motor or an AC motor suitable for speed control or torque control. In the present example, the conveyance motor 333 is a DC brushless motor. The conveyance motor 333 is provided with an encoder (or rotation speed detector) 333a for detecting the rotation amount thereof.

The cooling section 34 cools the continuous paper P heated by the heater of the fixing section 124 of the image forming apparatus 1.

The cooling section 34 cools the continuous paper P conveyed through the second conveyance path 35 by blowing air.

The cooling section 34 may be configured to blow cooled air using a cooling element such as a Peltier element.

The temperature detection section 36 is one of detection sections for detecting physical properties of the continuous paper P, and is arranged above the conveyed continuous paper P on the upstream side of the reading section 31. The temperature detection section 36 includes, for example, a radiation thermometer that detects the surface temperature of the continuous paper P. The temperature detection section 36 detects the surface temperature of the continuous paper P conveyed through the cooling section 34, and outputs it to the controller 9.

The reading section 31 includes a reading scanner 311 and a colorimeter 312. The reading scanner 311 is disposed on the upstream side of the colorimeter 312 in the conveyance direction. The scanner 311 is constituted by a line sensor such as a CCD (charge-coupled device) sensor. The colorimeter 312 is constituted by a spectral colorimeter.

The reading scanner 311 and the colorimeter 312 are capable of reading an image printed on the upper side of the continuous paper P conveyed through the second conveyance path 35. Read data of the formed image on the continuous paper P read by the reading scanner 311 and the colorimeter 312 is output to the controller 9. The controller 9 determines, for example, a position shift of the formed image based on the read data. The controller 9 performs a comparison process between the read data and image data that is a source of the formed image.

CONTROLLER

As shown in FIG. 2, the controller 9 includes a CPU (central processing unit) 91, ROM (read only memory) 92, RAM (random access memory) 93 and an HDD (hard disk drive) 94.
Components of the controller 9 are connected via a bus (not illustrated).

The CPU 91 reads, from the ROM 92, a program code of software that executes various controls and various processes for performing image formation on the continuous paper P, and executes the program.

The ROM 92 is used as an example of nonvolatile memory, and stores programs, data, and the like necessary for the CPU 91 to operate.

The RAM 93 is used as an example of volatile memory, and temporarily stores variables, parameters, and the like generated during arithmetic processing necessary for each processing performed by the CPU 91.

The HDD 94 is used as an example of a nonvolatile storage. The HDD 94 stores programs for the CPU 91 to control components, programs for an OS (operating system) and a controller, and data.

The recording medium storing the program executed by the controller 9 is not limited to the ROM 92 and the HDD 94, and may be, for example, a recording medium such as SSD (solid state drive), CD-ROM, or DVD-ROM.

The controller 9 is connected to the sheet feed device 5 of the image forming system 10, the image reading section 11, the media sensor 15, the image forming unit 12, and the operation display part 14 of the image forming apparatus 1, the cooling section 34, the second conveyance section 33, and the reading section 31 of the image reading device 3, and the sheet collection device 6. The controller 9 performs various types of processing including operation control on them and information communication, and executes image formation on the continuous paper P.

Figure 3:
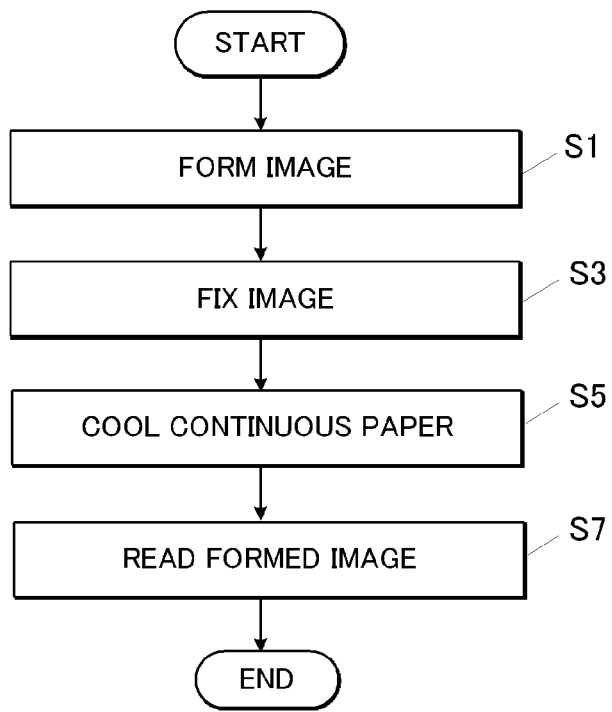
FIG. 3 is a process diagram illustrating schematic processes that are sequentially performed on a continuous sheet that is transported during image formation.

A schematic process performed in order on the continuous paper P conveyed in image formation will be described with reference to a process diagram of FIG. 3.

The continuous paper P is transported through the first conveyance path 13 of the image forming apparatus 1 and the second conveyance path 35 of the image reading device 3 by driving of the sheet feed device 5, the first conveyance section, the second conveyance section 33, and the paper collection device 6.

The image forming unit 12 transfers a toner image based on image data, which is acquired in advance by reading with the image reading section 11 or by communication from the outside, onto the continuous paper P by cooperation of the intermediate transfer belt 121 and the intermediate transfer roller 122 (Step S1).

The toner image transferred to the continuous paper P is fixed by pressure and heat in the fixing section 124 on the downstream side thereof (Step S3).

The continuous paper P on which the toner image is fixed and the image is formed is cooled by the cooling section 34 of the image reading device 3 (Step S5). The formed image is read by the reading scanner 311 and the colorimeter 312 (Step S7).

At this time, the CPU 91 compares the read image data of the formed image with the original image data. The CPU 91 determines whether the reproducibility of the image or colors is appropriate or whether a faulty sheet (a defective state including a positional deviation of an image, a flaw of the continuous paper P, a fold, or the like) has occurred. The CPU 91 records the results. The CPU 91 may obtain a correction value for the formed image for image formation from the obtained result of suitability determination, and may perform correction processing in subsequent image formation.

The continuous paper P on which the image has been formed is rewound by the sheet collection device 6. The image formation is completed.

The processing on the continuous paper P in the steps shown in Steps S1 to S7 is executed in parallel under the control of the CPU 91 on sections of the continuous paper P being conveyed.

MOTOR CONTROL FOR FIRST CONVEYANCE SECTION AND SECOND CONVEYANCE SECTION

In the steps of the above-described image formation, the CPU 91 of the controller 9 controls the speeds of the transfer motor 123 and the fixing motor 127 (first conveyance section) located on the upstream side of the conveyance path in the system so as to maintain the target speed. The CPU 91 controls the torque of the conveyance motor 333 (second conveyance section 33) located on the downstream side of the conveyance path so as to maintain the target torque.

The following describes contents of the control on the motors 123, 127, 333.

In a case where the continuous paper P is conveyed by rollers driven by different motors on the upstream side and the downstream side in the conveyance direction, a target speed of the motor on the downstream side is set to be slightly higher than that of the motor on the upstream side, and the speed of each motor is controlled. This avoids occurrence of slack in the continuous paper P.

Therefore, the controller 9 controls the speeds of the transfer motor 123 of the first conveyance section and the fixing motor 127 on the downstream side thereof while setting the target speed of the fixing motor 127 slightly higher than the target speed of the transfer motor 123. This suppresses occurrence of slack in the continuous paper P.

Figure 4:
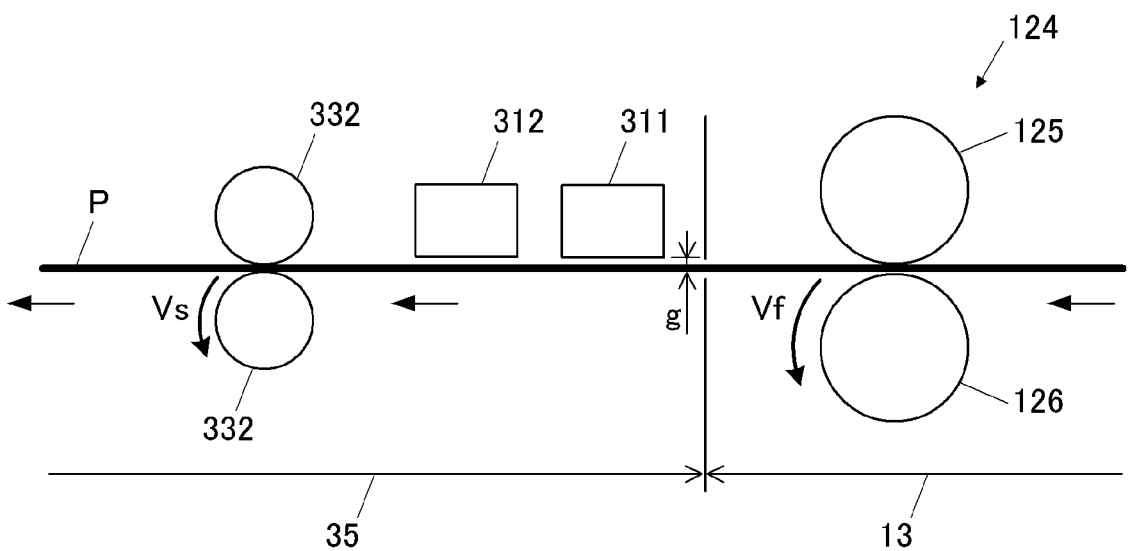
FIG. 4 is an explanatory diagram showing a schematic configuration from a fixing section to the second conveyance section.

As shown in FIG. 4, a reading scanner 311 for reading a formed image is disposed between the fixing section 124 and the second conveyance section 33. The distance "g" between the reading scanner 311 and the image forming surface of the continuous paper P greatly affects the reading accuracy. Therefore, it is important to suppress occurrence of slack of the continuous paper P between them.

However, the following issues occur in controlling the speeds of the fixing motor 127 and the conveyance motor 333 on the downstream side thereof while setting the target speed of the conveyance motor 333 slightly higher than the target speed of the fixing motor 127.

The fixing motor 127 affects the entire behavior of the continuous paper P conveyed in the first conveyance path 13, and greatly affects the quality of a formed image. In order to realize stable conveyance of the continuous paper P while eliminating influence from other conveyance systems, a motor having a large torque output is adopted.

Since the fixing section 124 heats and pressurizes the continuous paper P, the fixing roller 125 and the pressure roller 126 made of a metal material or the like having a large heat capacity tend to be adopted in order to suppress a temperature change. Thus, rollers having large inertia are adopted.

Figure 5:
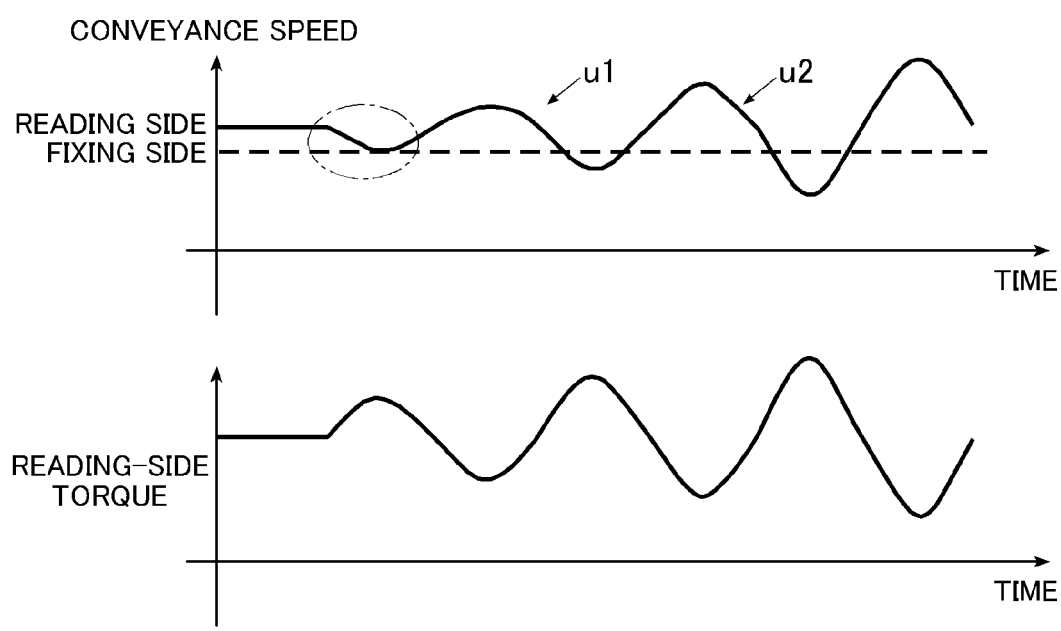
FIG. 5 is a graph which shows change of each motor speed over time and change of torque over time in the case where the speed of a conveyance motor is controlled to be somewhat higher than that of a fixing motor.

The upper diagram of FIG. 5 illustrates change in each motor speed over time in a case where speed control is performed on the fixing motor 127 and speed control is performed on the conveyance motor 333 so as to be slightly higher than the fixing motor 127. The lower diagram of FIG. 5 illustrates change in the torque of the conveyance motor 333 over time in that case. In the upper diagram of FIG. 5, the solid line represents speed change of the conveyance motor 333. The dotted line represents speed change of the fixing motor 127.

In a case where the fixing motor 127 on the upstream side is a motor having a larger torque output, since the fixing motor 127 stably maintains its target speed, the conveyance motor 333 on the downstream side cannot maintain the target speed. Overshooting and undershooting occur alternately starting from occurrence of speed decrease (state u1 in the upper diagram in FIG. 5). In this case, the output of the torque of the conveyance motor 333 repeatedly increases and decreases. This may also develop into an oscillation state with larger amplitudes (state u2 in the upper diagram of FIG. 5).

As a result, the continuous paper P is conveyed in a state where tension of the continuous paper P repeatedly increases and decreases between the fixing roller 125 and the pressure roller 126, and between the pair of conveyance rollers 332. This may impair the image reading accuracy of the reading scanner 311.

Therefore, the CPU 91 of the controller 9 performs torque control for maintaining a target torque, rather than speed control for maintaining a target speed, on the conveyance motor 333 of the image reading device 3.

In a case where the conveyance motor 333 is a DC brushless motor, the generated torque T can be obtained from the following Expression (1). Relation of the following equation (2) can be obtained from Expression (1).

$$T = Kt^* Im \quad (1)$$

$$T = -\frac{K_t \cdot K_e}{R_m} \cdot N + \frac{K_t}{R_m} \cdot V_m \quad (2)$$

Vm motor source voltage (V)
Rm motor armature resistance (Ω)
Kt motor torque constant (N*m/A)
Ke motor counter-electromotive constant (V/rpm)
N motor rotation speed (rpm)
Im motor drive current (A)

The CPU 91 of the controller 9 performs control such that the generated torque T of the conveyance motor 333 maintains a target torque.

To be specific, the CPU 91 detects a motor rotation speed N and a motor power source voltage V, which are variables in Expression (2) above, in the conveyance motor 333. The CPU 91 calculates the generated torque T from these detected values. The motor source voltage V is controlled so that the generated torque T maintains the target torque. Adjustment of the motor power source voltage V is performed based on increase/decrease in the duty ratio in the PWM (pulse width modulation) control.

TARGET TORQUE SETTING PROCESSING

The target torque in the torque control of the conveyance motor 333 should be such a value that the conveyance speed Vs (see FIG. 4) by the conveyance motor 333 is always larger than the conveyance speed Vf (see FIG. 4) by the fixing motor 127, that is, tension can always be applied to the continuous paper P toward the downstream side between the fixing section 124 and the second conveyance section 33.

In order to acquire such a value of the target torque of the conveyance motor 333, the CPU 91 of the controller 9 performs target torque setting processing during non-image formation.

Figure 6:
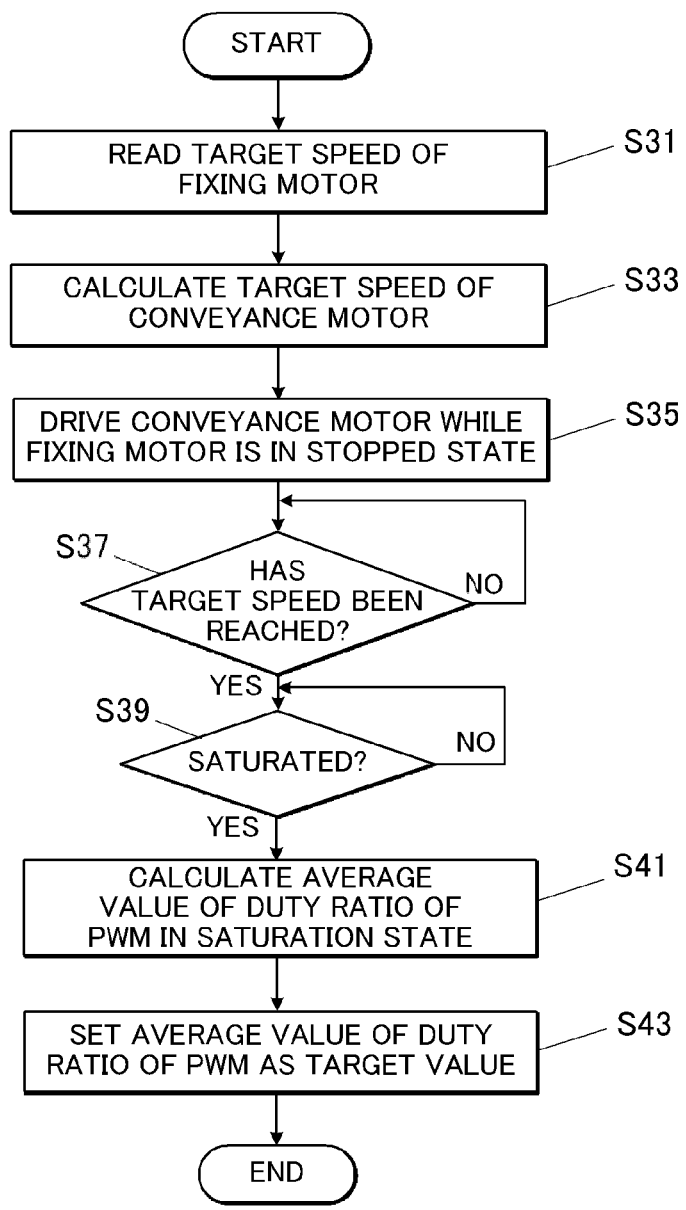
FIG. 6 is a flowchart of target torque setting processing.
Figure 7A:
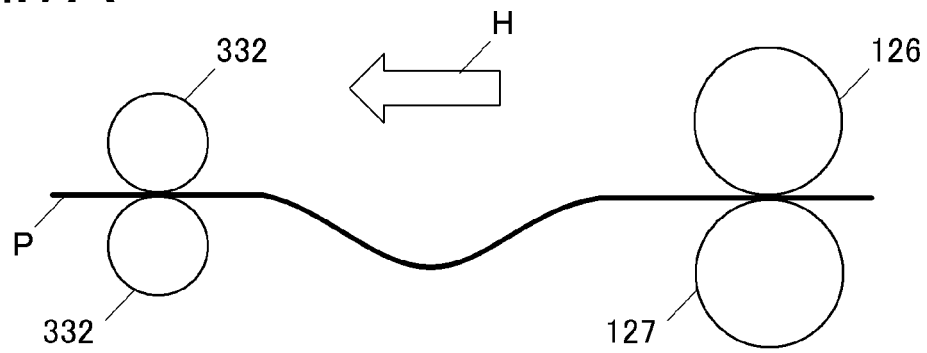
FIG. 7A is an explanatory diagram illustrating a conveyance state of a continuous sheet when the conveyance motor is stopped.
Figure 7B:
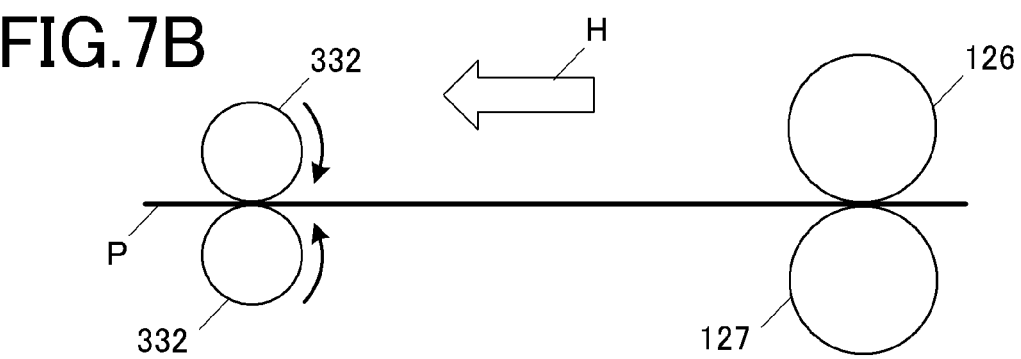
FIG. 7B is an explanatory diagram illustrating a conveyance state of the continuous sheet during driving.
Figure 7C:
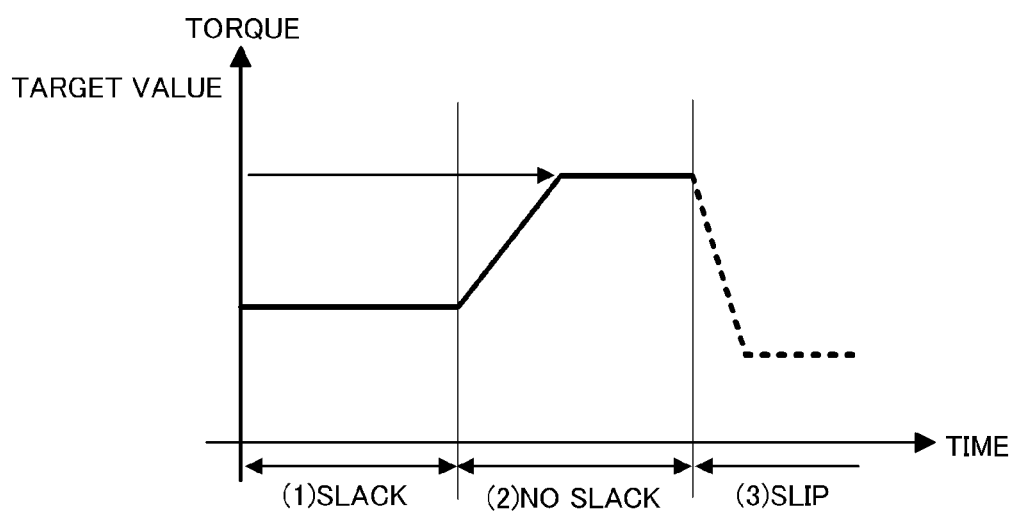
FIG. 7C is a graph showing a torque change in the conveyance states in FIG. 7A and FIG. 7B.

FIG. 6 is a flowchart of the target torque setting processing. FIGS. 7A and 7B illustrate a conveyance state of the continuous paper P. FIG. 7C shows torque change. The arrows H in FIGS. 7A and 7B represent the conveyance direction of the continuous paper P.

The target torque setting processing is executed, for example, when the sheet feed device 5 is replaced, when a new roll of the continuous paper P is set in the sheet feed device 5, or when an execution instruction is input from the operation display part 14. The target torque setting processing may be executed periodically.

The CPU 91 of the controller 9 first reads a set value of a target speed in the speed control of the fixing motor 127 (Step S31). The set value of the target speed of the fixing motor 127 is set by a user on the operation display part 14 and is stored in the HDD 94. Reading from the HDD 94 is performed.

Next, the CPU 91 calculates a target speed of the conveyance motor 333 from the target speed of the fixing motor 127 (Step S33). The target speed of the conveyance motor 333 in the target torque setting processing is, for example, a value obtained by adding one to several percent to the target speed of the fixing motor 127.

Next, the CPU 91 drives the conveyance motor 333 in the conveyance direction while controlling the fixing motor 127 to be in a stopped state (a state in which stopping torque is generated) so that the fixing roller 125 and the pressure roller 126 do not rotate (Step S35). At this time, speed control is performed so that the speed of the conveyance motor 333 becomes the calculated target speed.

Next, the CPU 91 repeats determination of whether the rotation speed detected by the encoder 333a of the conveyance motor 333 has reached the target speed (Step S37). When the rotation speed reaches the target speed, the CPU 91 determines whether the torque of the conveyance motor 333 has become saturated (Step S39).

FIG. 7A to FIG. 7C describe torque change of the conveyance motor 333.

First, in the section (1) of FIG. 7C, the conveyance motor 333 is not yet driven, and slack occurs in the continuous paper P. When the conveyance motor 333 is driven, the torque increases toward the target speed as illustrated in the section (2).

Then, when the target speed is reached and the slack of the continuous paper P is eliminated, tension is generated in the continuous paper P. The rate of increase in the torque of the conveyance motor 333 decreases, and the torque becomes saturated. That is, a state in which the inclination in the torque change is sufficiently reduced (the flat part in the section (2)) is the saturation state.

Furthermore, as illustrated in the section (3), after the saturation state, the conveyance roller 332 slips on the continuous paper P. The torque of the conveyance motor 333 rapidly decreases.

In Step S39, the CPU 91 calculates the torque of the conveyance motor 333 at prescribed sampling intervals by the above-described Expression (2). The CPU 91 monitors the change.

The torque saturation state can be detected based on whether the inclination of the torque change has become smaller than a predetermined threshold value.

When the saturation state of the torque is detected, the CPU 91 records the value of the duty ratio of the PWM control corresponding to the torque value during the saturation state period. The CPU 91 determines a representative value from a plurality of values of the duty ratio during the saturation state period. A statistical method, such as averaging or extraction of the mode, the minimum value, or the maximum value, can be used to determine the representative value. In this example, averaging is used (Step S41).

A torque value corresponding to the average value of the duty ratio during the saturation state period is set as the target torque (Step S43).

In the state where the torque of the conveyance motor 333 is saturated, there is no slack in the continuous paper P and tension is applied thereto. The value of the torque of the conveyance motor 333 in this state is set as the target torque of the torque control. Thus, regardless of the conveyance speed of the fixing motor 127, the continuous paper P can be conveyed while a tension that does not cause slack in the continuous paper P is applied toward the downstream side between the fixing section 124 and the second conveyance section 33.

TORQUE CORRECTION ACCORDING TO PHYSICAL PROPERTIES OF PAPER

The tension of the continuous paper P during expansion and contraction varies according to its physical properties.

A force F required for the conveyance motor 333 can be represented by the following Expression (3). The force F is correlated (for example, proportional) to the torque of the conveyance motor 333.

$$F = Fr - Fp \quad (3)$$

Fr: force required for conveying continuous paper by conveyance roller
Fp: tension of continuous paper during expansion and contraction Further, the force Fr can be expressed by the following Expression (4), and the tension Fp can be expressed by the following Expression (5).

The following expression (6) is an expression for approximately obtaining the strain ε of the continuous paper P included in the expression (5) from the conveyance speed Vs of the conveyance motor 333 and the conveyance speed Vf of the fixing motor 127.

$$F_r = \frac{J}{r}\frac{d\omega}{dt} + \mu mg + T_L \quad (4)$$

$$F_p = AE\varepsilon = AE\frac{V_s - V_f}{V_s} \quad (5)$$

$$\varepsilon = \frac{\Delta\varepsilon}{\varepsilon_0} \fallingdotseq \frac{V_s - V_f}{V_s} \quad (6)$$

J motor inertia
r roller radius
μ friction coefficient between continuous paper and roller
m mass of continuous paper
TL mechanical load of motor and roller
A cross-sectional area of continuous paper
E elastic coefficient of continuous paper
ε distortion of continuous paper As shown in Expressions (3) to (5), the tension Fp of the continuous paper P included in the force F necessary for the conveyance motor 333 is proportional to the elastic coefficient E of the continuous paper.

Figures 8, 9:
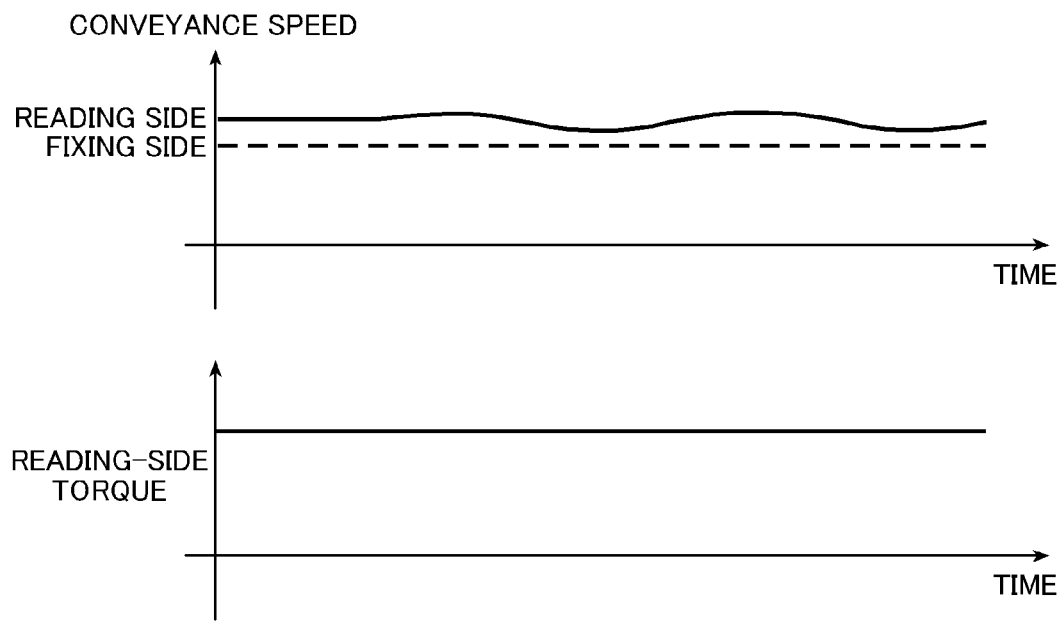
FIG. 8 is a table showing an example of relationship between the density, the moisture content, and the elastic coefficient for each type of continuous paper.
FIG. 9 is a diagram which shows change of each motor speed over time and change of torque over time in a case where speed control for the fixing motor and torque control for the conveyance motor are performed.

FIG. 8 is a table showing an example of relationship between the density, the moisture content, and the elastic coefficient for each type of continuous paper P. As shown in FIG. 8, the density and moisture content of the continuous paper P have a correlation (for example, a proportional relationship) with the elastic coefficient.

Therefore, in a case where the value of the target torque has already been acquired by the above-described target torque setting processing for the continuous paper P whose density and moisture content have already been obtained, it is possible to obtain the target torque of another continuous paper P having different physical properties by correcting the existing value of the target torque when conveying another continuous paper P having the different physical properties.

To be more specific, when a new or unknown type of continuous paper P is set, the CPU 91 of the controller 9 detects the density and moisture content of the continuous paper P by the media sensor 15 of the image forming apparatus 1 before image formation.

Next, the CPU 91 calculates the amount of change or the rate of change in the elastic coefficient based on the numerical difference between the density and moisture content of the continuous paper P for which the value of the target torque has already been acquired and the density and moisture content of the new continuous paper P. Based on this, the CPU 91 can calculate the corrected tension Fp of the new continuous paper P. If the corrected tension Fp is determined, the force F necessary for the conveyance motor 333 is obtained, and thus the target torque can be calculated from the force F.

As in the example of FIG. 8, in a case where the density and the moisture content are substantially fixed values for each paper type, the corrected tension Fp calculated for each paper type in advance can be prepared as table data.

When the density and the moisture content of the continuous paper P are detected before image formation, the paper type can be specified from the table data. The corrected tension Fp determined for each paper type can be acquired. The target torque can be calculated from the corrected tension Fp in the same manner as described above.

The surface temperature of the continuous paper P also has a correlation with the elastic coefficient. The image reading device 3 is provided with the temperature detection section 36. For example, in a case where the value of the target torque has already been acquired by the above-described target torque setting processing, the amount of change or the rate of change in the elastic coefficient is calculated from a temperature difference between the surface temperature of the continuous paper P at the time when the target torque is acquired and the surface temperature of the continuous paper P newly detected at the time of image formation. Based on this, the corrected tension Fp can be calculated. In the same manner as described above, the target torque according to the temperature change can be calculated.

The temperature change of the continuous paper P can occur constantly regardless of change of the paper type. Therefore, the temperature detection may be performed more frequently or continuously not only at the time of replacement of the continuous paper P but also at the time of image formation. The target torque is corrected according to the temperature change.

Regarding the correction of the target torque according to various physical properties of the continuous paper P, an example in which the correction is performed using the target torque acquired by the above-described target torque setting processing as a reference has been described. A value acquired by any method, such as a value of the target torque obtained by calculation or simulation or a value of the target torque obtained by experimental measurement, may be used as the value of the target torque serving as a reference.

EFFECT OF TORQUE CONTROL OF SECOND CONVEYANCE SECTION

As described above, in the image forming system 10, the controller 9 controls the speed of the fixing motor 127 that is a drive source of the first conveyance section. The controller 9 performs torque control on the conveyance motor 333 which is a drive source of the second conveyance section 33 of the image reading device 3.

The upper diagram of FIG. 9 illustrates a change in each motor speed over time in a case where speed control is performed on the fixing motor 127 and torque control is performed on the conveyance motor 333. The lower diagram of FIG. 9 illustrates change in the torque of the conveyance motor 333 over time in that case. In the upper diagram of FIG. 9, the solid line represents speed change of the conveyance motor 333. The dotted line represents speed change of the fixing motor 127.

As described above, since a motor having a large torque output is adopted as the fixing motor 127, the target speed can be stably maintained by the speed control during the conveyance.

On the other hand, the conveyance motor 333 is subjected to torque control for maintaining a target torque. Even if the conveyance motor 333 is a motor having a torque output smaller than that of the fixing motor 127, occurrence of overshoot or undershoot is avoided. It is possible to convey the continuous paper P while reducing speed fluctuation and applying a constant tension to the continuous paper P.

As a result, the reading section 31 can read an image formed on the continuous paper P in a state in which the elongation rate of the continuous paper P is maintained constant. In the reading section 31, a reading height (depth) can be maintained constant. This makes it possible to stably maintain high reading accuracy.

In particular, in the image reading device 3, the second conveyance section 33 is placed on the downstream side in the conveyance direction with respect to the reading section 31. Therefore, it is possible to allow the reading section 31 to read an image on the continuous paper P in a state where the tension is maintained constant. This makes it possible to perform reading stably with high reading accuracy.

The first conveyance section includes the fixing motor 127 serving as a conveyance section of the fixing section 124. Even in a case where a motor having a large torque output is selected as the fixing motor 127 in order to perform stable conveyance of the continuous paper P in the first conveyance path 13 in which the image formation is performed, the second conveyance section 33 can perform conveyance while stably applying a constant tension to the continuous paper P.

Therefore, while the image forming unit 12 realizes image formation with high image quality, the reading section 31 can stably maintain high reading accuracy.

The conveyance motor 333 of the second conveyance section 33 drives the conveyance roller 332 that conveys the continuous paper P. It is possible to easily realize conveyance in which the tension on the continuous paper P is maintained constant by the torque control on the conveyance motor 333.

In the image forming system 10, a DC brushless motor is used as the conveyance motor 333.

In a case of a configuration in which the sheet feed device 5 and the sheet collection device 6 participate in sheet conveyance as in the case of continuous paper P, when a stepping motor that is often used for sheet conveyance is used as the conveyance motor 333, a step-out may occur due to an effect of load fluctuation. However, a DC brushless motor is used as the conveyance motor 333 of the image forming system 10. Further, since torque control is performed, step-out does not occur even if it is affected by load fluctuation. Therefore, it is possible to suppress occurrence of deviation of the read image with respect to the reading section 31 and stably maintain high reading accuracy.

Further, the conveyance motor 333 is provided with the encoder 333*a* for detecting the rotation speed thereof. It is possible to perform torque control stably so that torque does not vary with rotation speed.

The image forming system 10 includes the medium sensor 15 for detecting physical properties of continuous paper P and the temperature detection section 36. The controller 9 performs torque control of the conveyance motor 333 with the target torque adjusted on the basis of the density, the moisture content, and the surface temperature of the continuous paper P detected by the above.

For this reason, even in a case where the paper type is changed or the temperature changes, it is possible to suppress fluctuation of tension in the continuous paper P and stably maintain high reading accuracy in the reading section 31.

The image forming system 10 includes a cooling section 34 for cooling the continuous paper P on the upstream side of the reading section 31 in the conveyance direction of the continuous paper P.

An image formed on the continuous paper P in a high-temperature state immediately after the fixing by the application of heat and pressure in the fixing section 124 may still be unstable. However, since the image forming system 10 includes the cooling section 34, it is possible to stabilize the image formed on the continuous paper P in the course of conveyance from the fixing section 124 to the reading section 31. It is possible to stably maintain high reading accuracy in the reading section 31.

If the temperature of the continuous paper P is high, this may affect the detection accuracy of the reading scanner 311 and the colorimeter 312 of the reading section 31. However, since the cooling section 34 is included, it is possible to reduce the effect of a high temperature and maintain high reading accuracy in the reading section 31.

The image forming system 10 includes a sheet collection device 6 on the downstream side of the reading section 31 in the conveyance direction of the continuous paper P to wind up the continuous paper P.

In this case where the sheet collection device 6 exists on the downstream side of the reading section 31 in the conveyance direction, reading accuracy in the reading section 31 can be improved also by performing torque control on a drive source of the sheet collection device 6 rather than the second conveyance section 33. However, in the sheet collection device 6, winding the continuous paper P into a roll shape increases the roll diameter. It is difficult to maintain the tension of the continuous paper P in the reading section 31 constant.

Therefore, the second conveyance section 33 is provided separately from the sheet collection device 6, and torque control is performed on the conveyance motor 333, which is the drive source of the second conveyance section 33. This makes it possible to more stably maintain the tension of the continuous paper P constant. This is also advantageous for maintaining high reading accuracy of the reading section 31.

In the image forming system 10, the controller 9 executes the target torque setting processing. In the target torque setting processing, the controller 9 stops the fixing motor 127 and drives the conveyance motor 333 at a prescribed target conveyance speed. The controller 9 acquires the duty ratio of the PWM control corresponding to the value at the time when the torque value of the conveyance motor 333 is saturated as a value corresponding to the target torque value.

Thus, the target torque can be set to such a value that the tension generated in the continuous paper P is maintained when the conveyance motor 333 is driven at a speed slightly higher than the target speed of the fixing motor 127. It becomes possible to perform torque control to apply a constant tension to the continuous paper P.

MOUNTING CALIBRATION SECTION FOR SHADING CORRECTION

The image reading device 3 of the image forming system 10 may be provided with a calibration section 37 for determining a correction value for shading correction to be performed in image reading by the reading section 31.

Figure 10A:
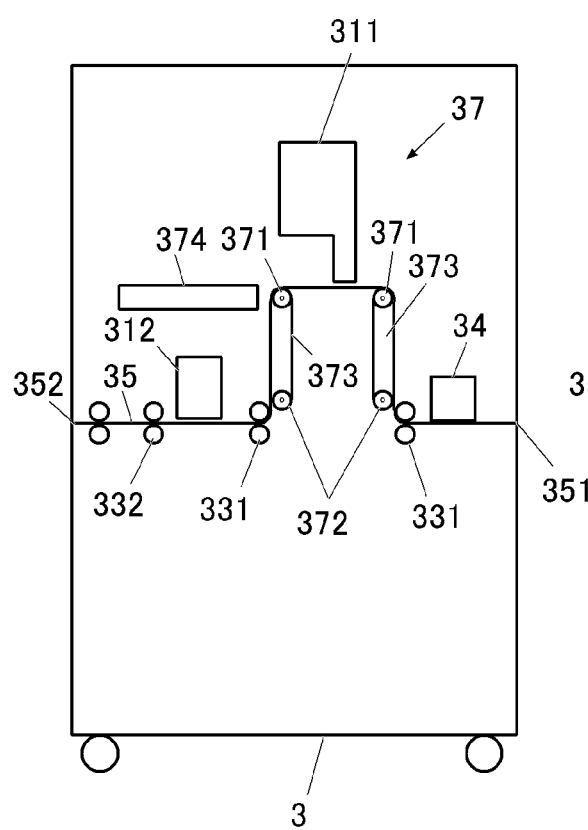
FIG. 10A is a schematic diagram of the image reading device provided with a calibration section and shows a state before operation of the calibration section.
Figure 10B:
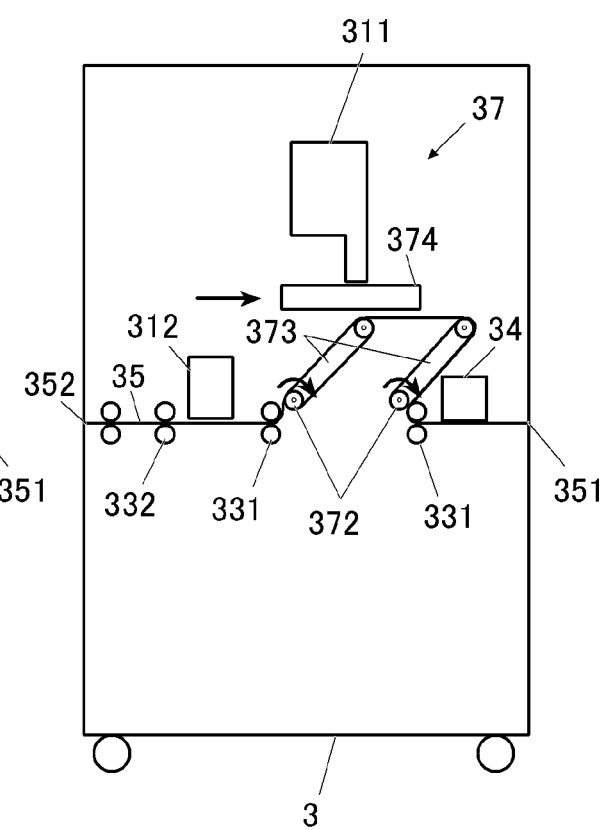
FIG. 10B is a schematic diagram of the image reading device provided with a calibration section and shows a state after operation of the calibration section.

FIGS. 10A and 10B are schematic views of the image reading device 3 to which the calibration section 37 is added, and illustrate states before and after operation of the calibration section 37.

The calibration section 37 is provided between the cooling section 34 and the colorimeter 312 on the second conveyance path 35.

The calibration section 37 includes:
two arm members 373 whose upper ends are rotatable;
an upper roller 371 provided at the upper end of each arm member 373;
a lower roller 372 provided at the lower end of each arm member 373; and
a white reference plate 374 read by the reading scanner 311 to perform calibration.

In the image reading device 3 provided with the calibration section 37, the reading scanner 311 is placed higher than the cooling section 34 and the colorimeter 312. The two arm members 373 and the rollers 371, 372 form a path along which the continuous paper P detours so as to pass near the lower side of the reading section of the reading scanner 311.

The lower end of one arm member 373 is disposed in the vicinity of the downstream side of the guide roller 331 provided on the downstream side in the conveyance direction of the cooling section 34. The lower end of the other arm member 373 is disposed in the vicinity of the upstream side of the guide roller 331 provided on the upstream side in the conveyance direction of the colorimeter 312.

Inside the image reading device 3, the lower end of each arm member 373 is supported so as to be rotatable about a rotation axis parallel to the rotation axis of each guide roller 331. Each of the upper rollers 371 and each of the lower rollers 372 are also supported by the arm member 373 so as to be rotatable about a rotation axis parallel to the rotation axis of each guide roller 331. The rollers 371, 372 are not rotationally driven by the drive source, and are driven to rotate by the continuous paper P being conveyed.

The continuous paper P is conveyed so as to pass through the lower roller 372 of the arm member 373 on the upstream side in the conveyance direction, the upper roller 371 of the arm member 373, the upper roller 371 of the arm member 373 on the downstream side in the conveyance direction, and the lower roller 372 of the arm member 373 in this order.

As a result, as shown in FIG. 10A, when the continuous paper P passes between the upper roller 371 of the arm member 373 on the upstream side in the conveyance direction and the upper roller 371 of the arm member 373 on the downstream side in the conveyance direction, the continuous paper P can pass near the lower side of the reading section of the reading scanner 311. An image formed on the continuous paper P can be read. Hereinafter, the conveyance path of the continuous paper P in FIG. 10A is referred to as a reading path.

As shown in FIG. 10B, the arm members 373 can be simultaneously rotated by an actuator (not shown) toward one side (for example, the upstream side) in the conveyance direction of the continuous paper P from a state in which the upper ends of the arm members 373 face upward. Operation of the actuator can be controlled by the controller 9.

Thus, the continuous paper P being conveyed can be separated downward from the reading section of the reading scanner 311. Hereinafter, the conveyance path of the continuous paper P in FIG. 10B is referred to as a retreat path.

The white reference plate 374 is supported so as to be slidable along the conveyance direction of the continuous paper P in the image reading device 3.

By the sliding movement, the white reference plate 374 can be switched between a position separated toward the upstream side in the conveyance direction with respect to the reading section of the reading scanner 311 and a position close to and facing the lower side of the reading section of the reading scanner 11.

The white reference plate 374 is configured to be capable of interlocking with each arm member 373.

That is, as shown in FIG. 10A, when the arm members 373 form the reading path, the white reference plate 374 retreats to the upstream side of the reading scanner 311 in the conveyance direction. As shown in FIG. 10B, when the actuator causes the arm members 373 to form the retreat path, the white reference plate 374 moves to a position close to and facing the reading section of the reading scanner 311.

With the above-described configuration, the calibration section 37 mainly forms a reading path during image formation. The reading scanner 311 can read an image formed on the conveyed continuous paper P.

Periodically or when a prescribed condition is satisfied, the arm members 373 are rotated to form the retreat path, and the white reference plate 374 is moved to a position opposite to the reading scanner 311. Thus, the reading scanner 311 reads a white surface of the white reference plate 374 and corrects the correction value of the shading correction.

As described above, the calibration section 37 moves the rollers 371, 372 between the arrangement of the reading path (FIG. 10A) and the arrangement of the retreat path (FIG. 10B) periodically or when a predetermined condition is satisfied.

Along with this path change, a path length of the conveyance path of the continuous paper P may change.

While the calibration section 37 forms the retreat path, the conveyance of the continuous paper P is continuously performed.

At this time, the second conveyance section 33 performs conveyance of the continuous paper P by driving the conveyance roller 332 by the conveyance motor 333 on the downstream side of the correction section 37 in the conveyance direction.

Torque control is performed for the conveyance motor 333. Therefore, even if the path length of the conveyance path of the continuous paper P changes due to the operation of the calibration section 37, constant tension can be applied to the continuous paper P. Even when the calibration section 37 returns to the reading path, it is possible to maintain high reading accuracy in the reading section 31.

MOUNTING OF POST-PROCESSOR

Figure 11:
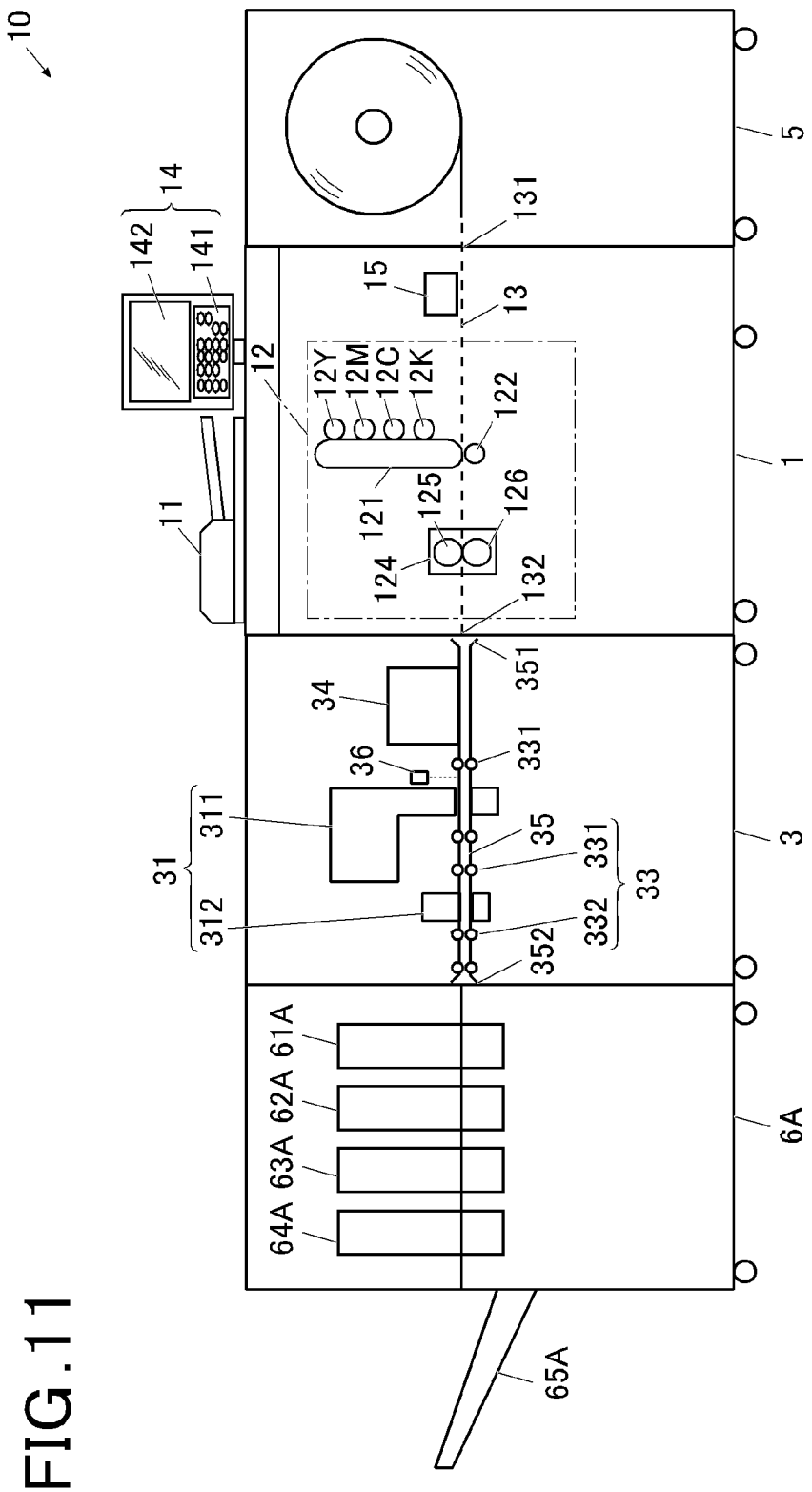
FIG. 11 is a schematic diagram of an image forming system including a post-processor.

The image forming system 10 may be configured to include a post-processor 6A in place of the sheet collection device 6. FIG. 11 shows a schematic diagram of the image forming system 10 which includes the post-processor 6A.

As shown in FIG. 11, the post-processor 6A includes a conveyance path connected to the sheet ejection port 352 of the image reading device 3. The post-processor 6A performs post-processing on the continuous paper P carried into the conveyance path from the sheet ejection port 352 as necessary. The post-processing is, for example, slitting processing, margin slitting processing, CD cutting processing, crease processing (upward convex or downward convex), FD/CD sewing machine processing, or the like. Post-processing other than the CD cutting processing is not essential, and for example, is executed only when an execution instruction is input from the operation display part 14.

The CD cutting processing is performed at such a position that the continuous paper P will have a set length in the conveyance direction. The cut paper is carried out to a purge tray 65A.

In the post-processor 6A, as shown in FIG. 11, post-processing modules 61A to 64A are arranged along the conveyance path. The number of post-processing modules can be increased or decreased.

For example, as the most upstream post-processing module 61A, a slitter is installed. As the second post-processing module 62A, a downward convex creaser for performing crease processing of creasing a sheet in a downward convex shape is installed. As the third post-processing module 63A, a margin slitter for cutting (margin cutting) a sheet at the central portion in the CD direction (sheet width-direction) is installed. As the fourth post-processing module 64A, a CD cutter which cuts the sheet in the CD direction (sheet width-direction) is installed.

In addition to those listed above, the post-processing modules may include:

an upwardly convex creaser configured to perform crease processing for forming an upwardly convex line on a sheet;

an FD sewing machine that makes perforations in an FD direction (sheet conveyance direction) in a sheet; and a CD sewing machine which makes perforations in the CD direction (sheet width direction Y) in a sheet.

It is necessary to perform various types of post-processing of the post-processor 6A at appropriate positions with respect to an image formed on the continuous paper P.

On the other hand, while the post-processing is performed by the post-processor 6A, the conveyance of the continuous paper P is continuously performed.

At this time, the second conveyance section 33 transports the continuous paper P by driving the conveyance roller 332 by the conveyance motor 333 on the upstream side in the conveyance direction of the post-processor 6A.

Since torque control is executed, the conveyance motor 333 can apply constant tension to the continuous paper P. The continuous paper P can be conveyed to the post-processor 6A while the amount of elongation is kept constant.

Therefore, in the post-processor 6A, it is possible to perform post-processing on an image formed on the continuous paper P accurately in the conveyance direction.

CONTROLLER

In the above example, the image forming system 10 includes a controller 9 that comprehensively controls the entire configuration. The image forming system 10 is not limited to this example. For example, two or more of the sheet feed device 5, the image forming apparatus 1, the image reading device 3, and the sheet collection device 6 may each include a controller. Each controller is communicably connected by a communication unit.

An example in which the image forming apparatus 1 and the image reading device 3 each include a controller will be described.

In a case where the image forming apparatus 1 and the image reading device 3 each include the controller, speed control of the transfer motor 123 and the fixing motor 127 that are the first conveyance section of the image forming apparatus 1 is performed by a CPU included in the controller of the image forming apparatus 1.

The torque control of the conveyance motor 333 of the second conveyance section 33 of the image reading device 3 is executed by a CPU of the controller of the image reading device 3.

In the torque control of the conveyance motor 333 of the image reading device 3, the target torque setting processing for acquiring the target torque described in FIG. 6 is executed. In this example, the controller of the image reading device 3 is a master. The controller of the image forming apparatus 1 is a slave. The controllers execute the target torque setting processing in cooperation.

Figure 12:
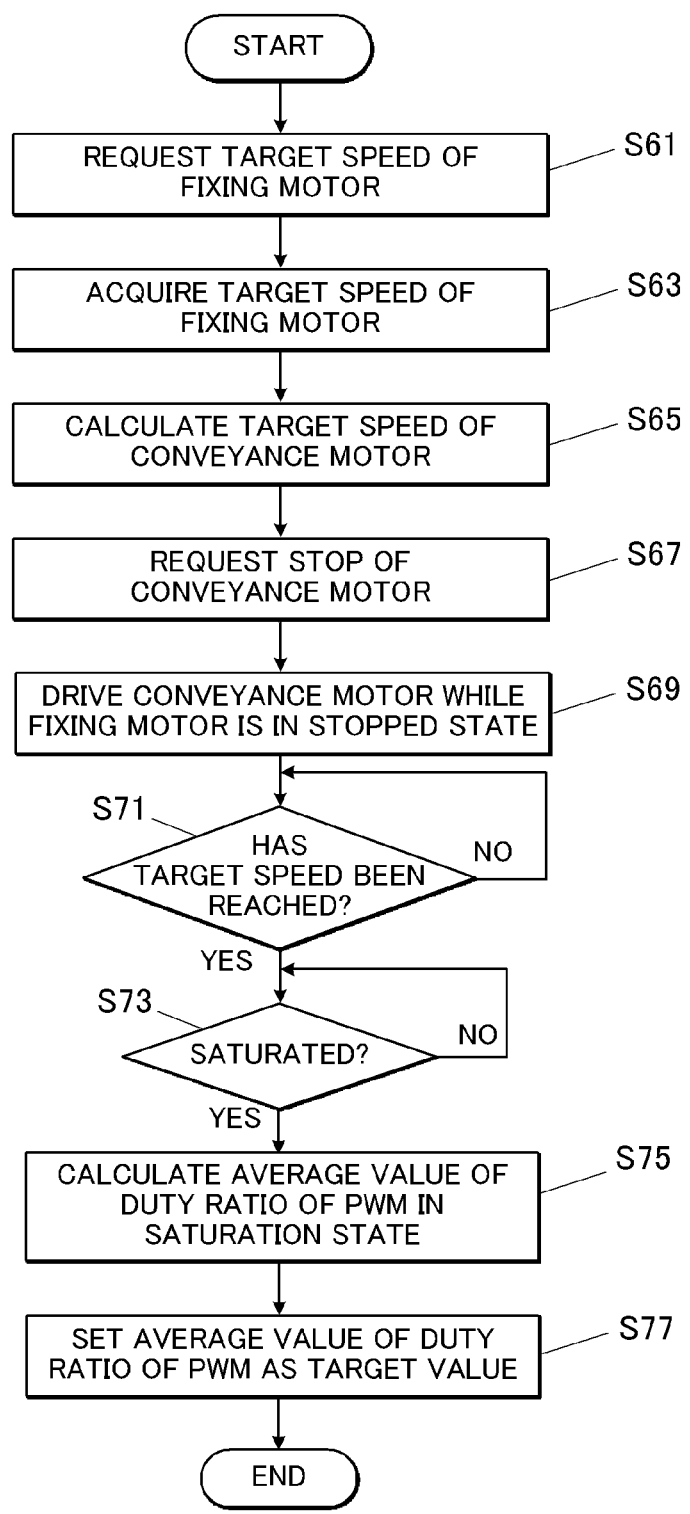
FIG. 12 is a flowchart of target torque setting processing in an image forming system having two controllers.

This processing will be described with reference to the flowchart of FIG. 12.

First, the controller (CPU) of the image reading device 3 requests the controller (CPU) of the image forming apparatus 1 to transmit a set value of a target speed in the speed control of the fixing motor 127 (Step S61).

Upon acquiring the target speed of the fixing motor 127 transmitted from the controller of the image forming apparatus 1 (Step S63), the controller of the image reading device 3 calculates a target speed of the conveyance motor 333 (Step S65). This calculation of the target speed is the same as that in the case of FIG. 6.

Next, the controller of the image reading device 3 requests the controller of the image forming apparatus 1 to perform control so that the fixing motor 127 becomes a stopped state (a state in which stopping torque is generated) (Step S67).

The controller of the image reading device 3 drives the conveyance motor 333 in the conveyance direction (Step S69). Speed control of the conveyance motor 333 is performed at the calculated target speed.

The controller of the image reading device 3 repeatedly determines whether the rotation speed detected by the encoder 333a of the conveyance motor 333 reaches the target speed (Step S71). When the rotation speed reaches the target speed, the controller determines whether the torque of the conveyance motor 333 has become saturated (Step S73).

When the saturation state of the torque is detected, the controller of the image reading device 3 records the value of the duty ratio of the PWM control corresponding to the torque value during the saturation state period, and averages the values (Step S75). The controller sets, as the target torque, a torque value corresponding to the mean value of the duty ratios during the saturation state period (Step S77).

As described above, even in a case where a plurality of controllers are provided, it is possible to perform the same processing and control as those of the controller that integrally controls the entire configuration.

OTHERS

The details shown in one or more embodiments of the present invention can be appropriately changed within the scope of the claims.

For example, although the continuous paper P is exemplified as the recording medium of the image forming system 10, the recording medium is not limited thereto, and a long paper sheet (long sheet) may be used as the recording medium. The recording medium is not limited to paper, and may be a sheet material made of another material such as resin.

For example, when a long paper sheet which is as long as the path length from the fixing section 124 to the conveyance rollers 332 is used as the recording medium, it is possible to obtain the same technical effect as in the case of the continuous paper P by applying the characteristic motor control described in one or more embodiments.

Furthermore, the transfer motor 123, the fixing motor 127, and the conveyance motor 333 may be a DC motor or an AC motor other than the DC brushless motor.

In such a case, a stepping motor can also be used as the transfer motor 123 and the fixing motor 127.

On the other hand, the use of a stepping motor is not suitable for the conveyance motor 333.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming system, comprising:
   an image forming device that is disposed at a first conveyance path and forms an image on a recording medium that is a continuous sheet or a long sheet;
   a first conveyor that conveys the recording medium on the first conveyance path in a conveyance direction;
   an image reading device that reads the image formed on the recording medium at a second conveyance path on a downstream side of the first conveyance path in the conveyance direction;
   a second conveyor that conveys the recording medium on the second conveyance path; and
   a controller that:
      controls a speed of a first drive source of the first conveyor, and
      controls and maintains a torque of a second drive source of the second conveyor to be a target torque.

2. The image forming system according to claim 1, wherein the second conveyor is positioned on a downstream side of the image reading device in the conveyance direction.

3. The image forming system according to claim 1, wherein the first conveyor includes a roller of a fixing device.

4. The image forming system according to claim 1, wherein the second drive source drives a drive roller that conveys the recording medium.

5. The image forming system according to claim 1, wherein the second drive source is a DC motor or an AC motor.

6. The image forming system according to claim 1, further comprising:
   a detector that detects a physical property of the recording medium, wherein
   the target torque corresponds to the physical property detected by the detector.

7. The image forming system according to claim 6, wherein the physical property includes a density of the recording medium.

8. The image forming system according to claim 6, wherein the physical property includes a moisture content of the recording medium.

9. The image forming system according to claim 6, wherein the physical property includes a surface temperature of the recording medium.

10. The image forming system according to claim 1, further comprising:
    a cooling device that cools the recording medium and that is positioned on an upstream side of the image reading device in the conveyance direction.

11. The image forming system according to claim 1, further comprising:

a sheet collection device that winds the recording medium on a downstream side of the image reading device in the conveyance direction.

12. The image forming system according to claim 1, further comprising:
a post-processor that performs post-processing to the recording medium on a downstream side of the image reading device in the conveyance direction.

13. The image forming system according to claim 1, wherein the controller applies tension to the recording medium by causing the second drive source to drive at a predetermined target conveyance speed while stopping the first drive source, and
the controller determines, as the target torque, the torque of the second drive source at a time when the torque is saturated.

14. The image forming system according to claim 1, further comprising:
a rotation speed detector that detects a rotation speed of the second drive source.

15. The image forming system according to claim 1, wherein
the image reading device comprises:
a reading scanner, and
a colorimeter,
the reading scanner and the colorimeter output read data of the image formed on the recording medium to the controller, and
the controller determines a position shift of the image formed on the recording medium based on the read data.

16. The image forming system according to claim 15, wherein
the image reading device further comprises:
a calibration unit that comprises:
arms;
an upper roller disposed at an upper end of each of the arms;
a lower roller disposed at a lower end of each of the arms; and
a reference plate, wherein
the arms, the upper roller, the lower roller, and the reference plate are configured to switchably form a reading path and a retreat path that have different lengths from each other, and
the controller controls and maintains the torque of a second drive source to be the target torque even in a case that the reading path and the retreat path are switched to each other.

17. A method of controlling an image forming system, wherein
the image forming system comprises:
an image forming device that is disposed at a first conveyance path and forms an image on a recording medium that is a continuous sheet or a long sheet;
a first conveyor that conveys the recording medium on the first conveyance path in a conveyance direction;
an image reading device that reads the image on the recording medium at a second conveyance path on a downstream side of the first conveyance path in the conveyance direction; and
a second conveyor that conveys the recording medium on the second conveyance path,
the method comprising:
controlling a speed of a first drive source of the first conveyor; and
controlling and maintaining a torque of a second drive source of the second conveyor to be a target torque.

\* \* \* \* \*